（12）United States Patent
Kokubo (10) Patent No.: US 10,816,662 B2
(45) Date of Patent: Oct. 27, 2020

(54) FLASHER TYPE FISH FINDER

(71) Applicant: HONDA ELECTRONICS CO., LTD., Toyohashi, Aichi (JP)

(72) Inventor: Hiroaki Kokubo, Toyohashi (JP)

(73) Assignee: HONDA ELECTRONICS CO., LTD., Aichi (JP)

( * ) Notice: Subject to any disclaimer, the term of this patent is extended or adjusted under 35 U.S.C. 154(b) by 343 days.

(21) Appl. No.: 16/034,994

(22) Filed: Jul. 13, 2018

(65) Prior Publication Data

US 2020/0018850 A1    Jan. 16, 2020

(51) Int. Cl.
  *G01S 15/96*    (2006.01)
  *G01S 7/521*    (2006.01)
  *G01S 7/56*     (2006.01)
  *A01K 97/12*    (2006.01)

(52) U.S. Cl.
  CPC ............ *G01S 15/96* (2013.01); *A01K 97/125* (2013.01); *G01S 7/521* (2013.01); *G01S 7/56* (2013.01)

(58) Field of Classification Search
  CPC . G01S 15/96; G01S 7/56; G01S 7/521; G01S 7/6209; A01K 97/125
  See application file for complete search history.

(56) References Cited

U.S. PATENT DOCUMENTS

| 4,682,177 A | 7/1987 | Shimizu |
| 2015/0009781 A1 | 1/2015 | Sano et al. |
| 2018/0088233 A1 | 3/2018 | Sano |
| 2020/0018850 A1* | 1/2020 | Kokubo .................. G01S 15/96 |

* cited by examiner

*Primary Examiner* — Daniel Pihulic
(74) *Attorney, Agent, or Firm* — Westerman, Hattori, Daniels & Adrian, LLP (57) ABSTRACT

A flasher type fish finder has: a motor with a rotary shaft having play in an axial direction; a display rotating disk fixed to the rotary shaft; a first installation part; and a second installation part fixed to a member not influenced by the play. In the first installation part, a magnet or a ferromagnetic material is on the rotary shaft or the display rotating disk such that the center of gravity is at the rotary shaft center. In the second installation part, a magnet or a ferromagnetic material is provided occurring an attraction force or a repulsive force in the axial direction, for the magnet or the ferromagnetic material of the first installation part. The magnet is in at least one of the first installation part and the second installation part. The surfaces of a first magnetic pole and a second magnetic pole are orthogonal to the rotary shaft.

20 Claims, 7 Drawing Sheets

FLASHER TYPE FISH FINDER

BACKGROUND OF THE INVENTION

1. Field of the Invention

The present invention relates to a flasher type fish finder, and more particularly, the present invention relates to a flasher type fish finder in which occurrence of noise upon use is suppressed.

2. Description of the Related Art

A flasher type fish finder, having a display rotating disk to which an LED (Light Emitting Diode) is fixed, to display an underwater detection result by rotating the display rotating disk, is known. The flasher type fish finder displays the underwater detection result by causing the LED to emit light when the LED comes to a position to indicate an underwater depth in a display window provided oppositely to the display rotating disk. The inventors have invented a flasher type fish finder 30 shown in FIGS. 1 and 2 U.S. patent application Ser. No. 15/276,255).

Figure 1:
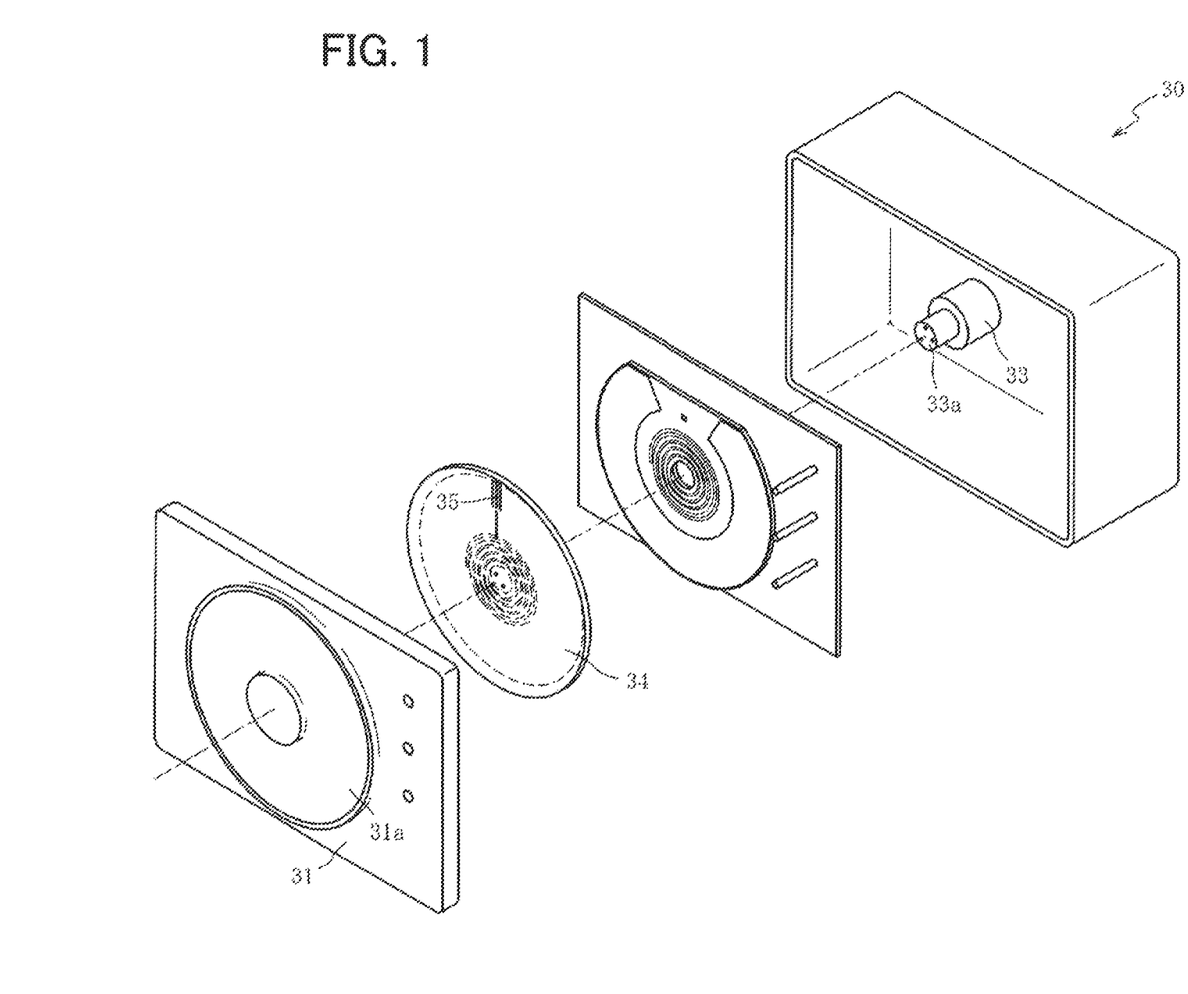
FIG. 1 is a side cross-sectional view of a flasher type fish finder as a related art.

In the flasher type fish finder 30, a display rotating disk 34 is fixed, oppositely to a display window 31a, to an end of a rotary shaft 33a of a motor 33 on the front case 31 side. With this configuration, the display rotating disk 34 is rotated with a motor 33.

Figure 2:
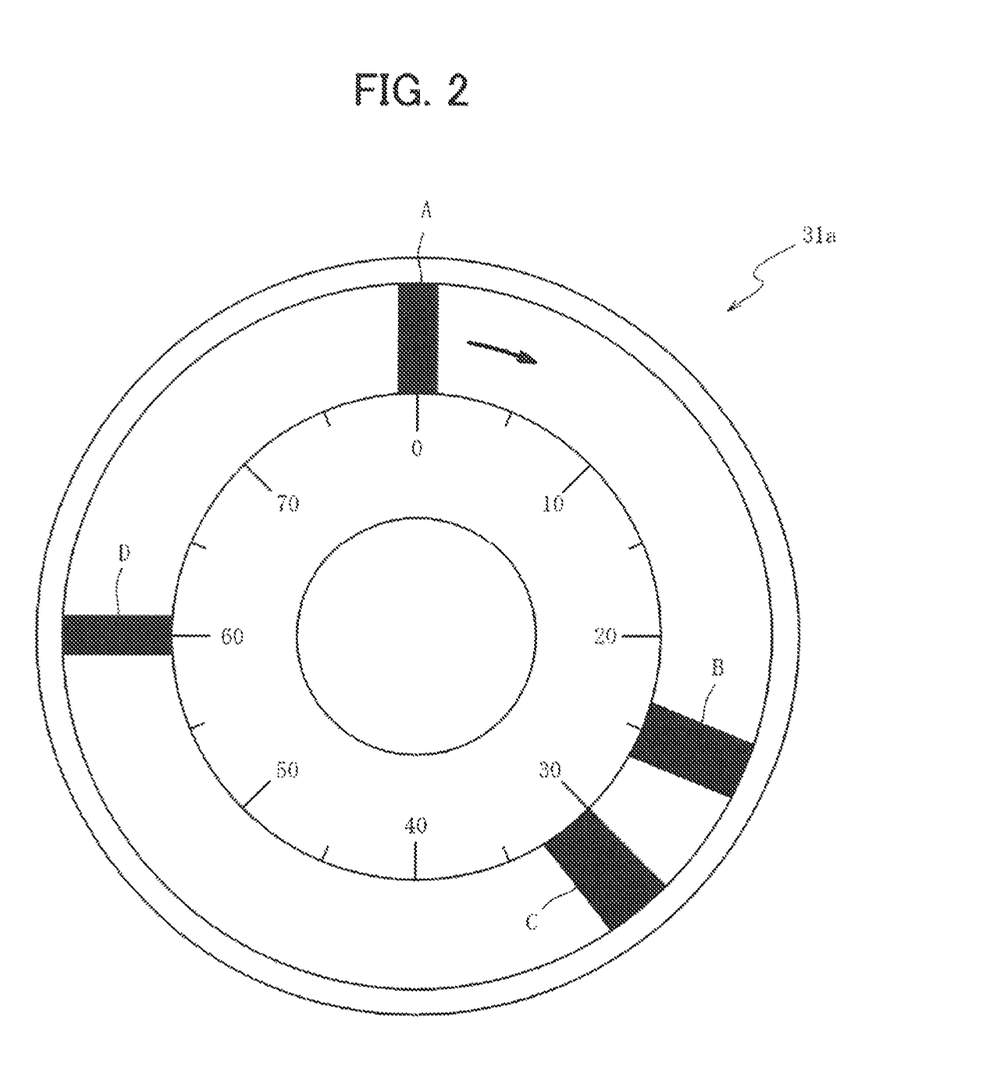
FIG. 2 is a diagram showing a display part of the flasher type fish finder.

A display LED 35 to emit light based on a signal indicating the underwater detection result is fixed on the display rotating disk 34 opposite to the display window 31a of the front case 31. As shown in FIG. 2, when the display rotating disk 34 rotates at a high speed, and when the display LED 35 comes to a position A to indicate the sea surface, a position B to indicate a fish school, a position C to indicate first reflection of bottom echo, and a position D to indicate second reflection of bottom echo, in the display window 31a, the display LED 35 emits light. With this configuration, the flasher type fish finder 30 causes a user to recognize the underwater detection result.

Note that the rotary shaft 33a has movable play in an axial direction. Accordingly, when the flasher type fish finder is inclined due to inclination of the installation site or the like, the rotary shaft moves in the axial direction by the weight and the play of the display rotating disk. Then the balance of relative positional relationship between the display rotating disk attached to the rotary shaft of the motor and the motor changes, and vibration occurs. As a result, noise occurs.

BRIEF SUMMARY OF THE INVENTION

The present invention has been made in consideration of the above-described situation, and provides a flasher type fish finder, in which constant relative positional relationship is maintained between a display rotating disk and a motor, regardless of inclination of the flasher type fish finder, and occurrence of noise due to vibration is suppressed.

To attain the above-described object, a flasher type fish finder according to the present invention comprises: a motor; a display rotating disk; a first installation part; and a second installation part. The motor has a rotary shaft having movable play in an axial direction. The display rotating disk is fixed to the rotary shaft. In the first installation part, a magnet or a ferromagnetic material is provided on the rotary shaft or the display rotating disk such that the center of gravity is positioned at the shaft center of the rotary shaft. In the second installation part, fixed to a member not influenced by the play of the rotary shaft, a magnet or a ferromagnetic material is provided such that an attraction force or a repulsive force occurs in the axial direction of the rotary shaft with respect to the magnet or the ferromagnetic material provided in the first installation part. The magnet is provided in at least one of the first installation part and the second installation part such that a surface of a first magnetic pole and a surface of a second magnetic pole are orthogonal to the rotary shaft.

The flasher type fish finder according to the present invention is provided with a motor with a rotary shaft having movable play in an axial direction, and a display rotating disk fixed to the rotary shaft. Further, the fish finder has the first installation part in which the magnet or the ferromagnetic material is provided on the rotary shaft or the display rotating disk such that the center of gravity is positioned at the shaft center of the rotary shaft, and the second installation part, fixed to the member not influenced by the play of the rotary shaft, in which the magnet or the ferromagnetic material is provided such that an attraction force or a repulsive force occurs on the axial direction of the rotary shaft with respect to the magnet or the ferromagnetic material provided in the first installation part. The magnet is provided in at least one of the first installation part and the second installation part such that the surface of the first magnetic pole and the surface of the second magnetic pole are orthogonal to the rotary shaft. With this configuration, the magnet acts on another magnet or ferromagnetic material, an attraction force or a repulsive force in the axial direction of the rotary shaft occurs. At this time, in the first installation part, the magnet or the ferromagnetic material is provided on the rotary shaft or the display rotating disk fixed to the rotary shaft. On the other hand, in the second installation part, the magnet or the ferromagnetic material is provided on the member not influenced by the play of the rotary shaft. Accordingly, the magnet or the ferromagnetic material in the first installation part is pulled or pushed in the axial direction by the play provided on the rotary shaft, with the attraction force or the repulsive force in the axial direction of the rotary shaft. Accordingly, the movement of the rotary shaft in the axial direction of the rotary shaft by the play is limited. Accordingly, regardless of inclination of the flasher type fish finder, it is possible to maintain constant balance of relative positional relationship between the display rotating disk and the motor, and it is possible to suppress occurrence of vibration. As a result, it is possible to suppress occurrence of noise.

DETAILED DESCRIPTION OF THE INVENTION

Figure 3:
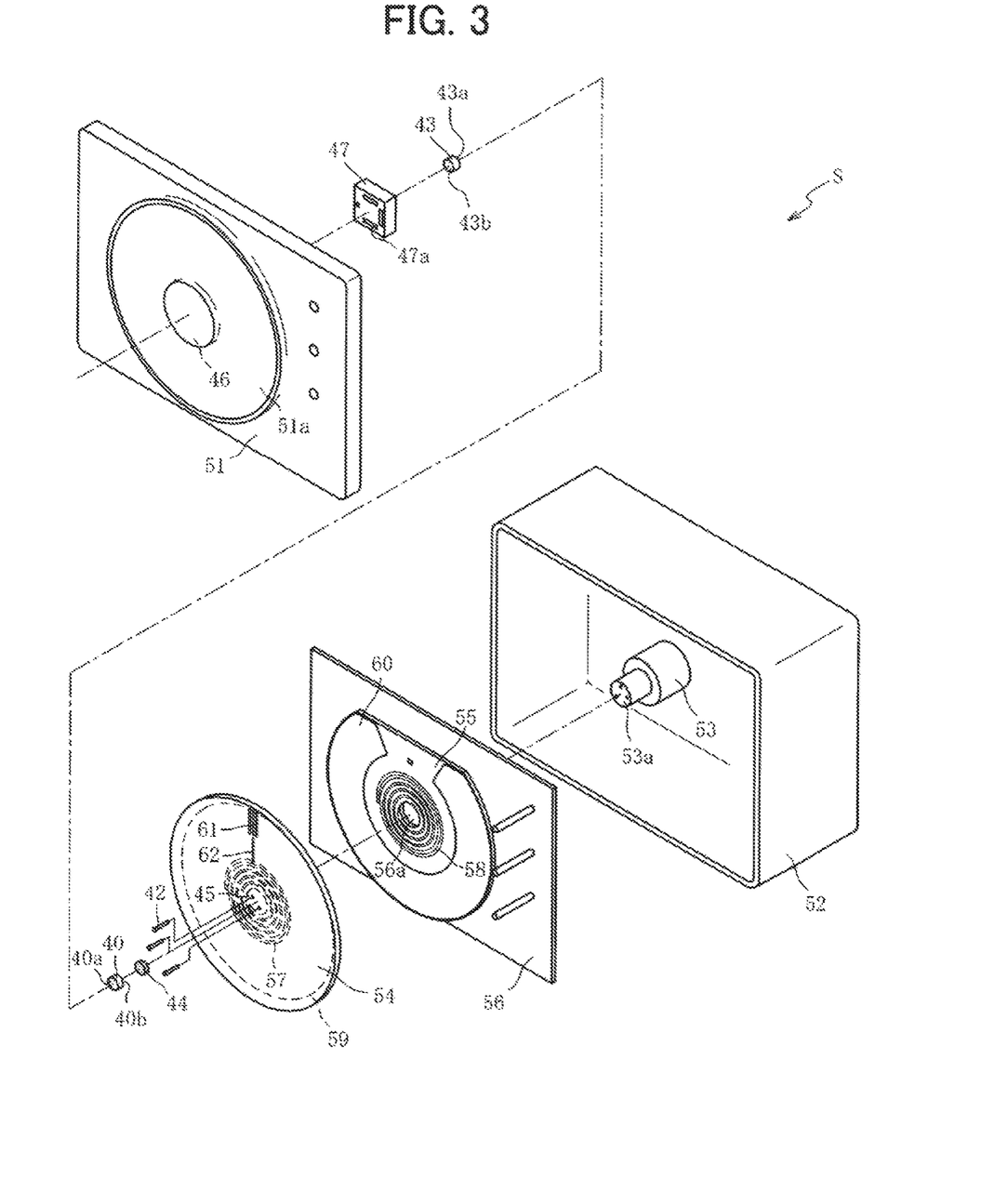
FIG. 3 is an exploded perspective view of a flasher type fish finder according to a first embodiment of the present invention.
Figure 4:
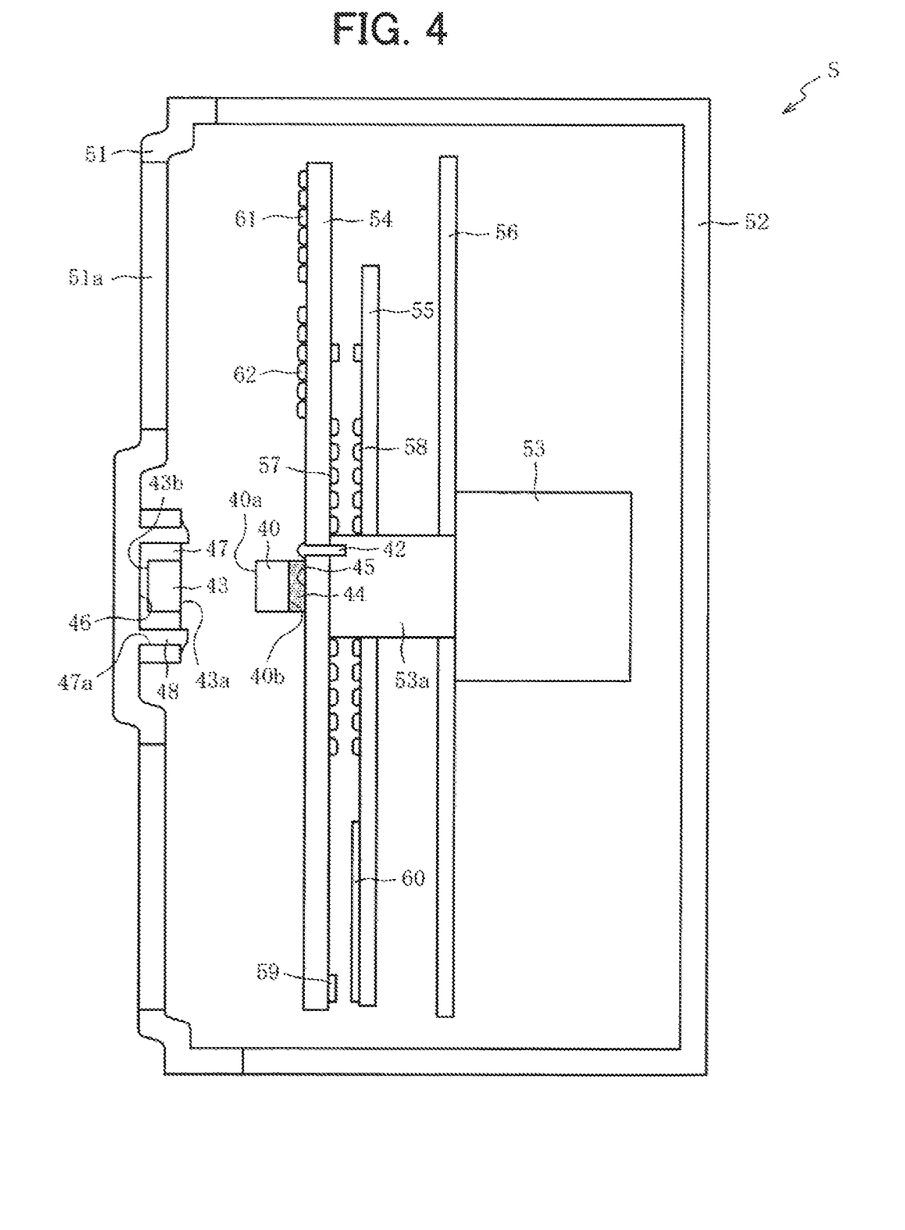
FIG. 4 is a side cross-sectional view of the flasher type fish finder.

Hereinbelow, embodiments of the present invention will be described with reference to the attached drawings. First, a flasher type fish finder S as a first embodiment of the present invention will be described with reference to FIGS. 3 and 4. FIG. 3 is an exploded perspective view of the flasher type fish finder S according to the first embodiment of the present invention. FIG. 4 is a side cross-sectional view of the flasher type fish finder S.

As shown in FIGS. 3 and 4, a front case 51 in which a transparent display window 51a is formed is fitted in a case 52 of the flasher type fish finder S.

In the case 52, a motor 53 is fixed to a main board 56. Further, a combined substrate 55 is fixed to the main board 56. A rotary shaft 53a of the motor 53 projects, through a center hole 56a at the center of the combined substrate 55 and at the center of the main board 56, to the front case 51 side. The rotary shaft 53a has movable play in an axial direction.

At the end of the rotary shaft 53a on the front case 51 side, a display rotating disk 54 is fixed with a screw 42 to the rotary shaft 53a oppositely to the display window 51a. With this configuration, the display rotating disk 54 is rotated with the motor 53.

A power transmission coil 53 to transmit, electric power for light emission is attached around the center hole 56a on the combined substrate 55. A power receiving coil 57 to receive the electric power for light emission is attached in a position around the rotary shaft 53a of the display rotating disk 54 and on the display rotating disk 54 opposite to the power transmission coil 58. The power receiving coil 57 and the power transmission coil 58 are electromagnetically coupled, such that the electric power is transmitted from the power transmission coil 58 to the power receiving coil 57.

Further, a ring-shaped transmitting antenna 60, to transmit a light emission signal to cause light emission with an LED to be described later, based on an ultrasonic received wave, transmitted from an oscillator installed in the water, is fixed to the outer periphery of the combined substrate 55. A ring-shaped receiving antenna 59 to receive the light emission signal is attached in a position on the outer periphery of the display rotating disk 54 and on the display rotating disk 54 opposite to the transmitting antenna 60. When the radio wave of the light emission signal is transmitted from the transmitting antenna 60 and the radio wave is received with the receiving antenna 59, the light emission signal is transmitted from the combined substrate 55 side to the display rotating disk 54 side.

Further, a display LED 61 and a character display LED 62, for light emission based on the light emission signal received with the receiving antenna 59, are fixed on the display rotating disk 54 opposite to the display window 51a of the front case 51. The display rotating disk 54 is rotated at a high speed with the motor 53, and as shown in FIG. 2, in the display window 51a, when the display LED 61 comes to a position A to indicate the sea surface, a positon B to indicate a fish school, a position C to indicate first reflection of bottom echo, and a position D to indicate second reflection of bottom echo, the display LED 61 emits light based on the light emission signal. With this configuration, the flasher type fish finder S notifies a user of a positional relationship among the fish school, the sea surface, and the sea bottom. The character display LED 62 emits light when it comes to a predetermined position of the display window 51a, to indicate characters (e.g. "AUTO-R 9.5 FEET") indicating underwater detection conditions and the like for the user.

A first installation part 45 exists in a position on an extended line from the rotary shaft 53a in a surface of the display rotating disk 54 on the front case 51 side. A magnet 40 is provided in the first installation part 45. The magnet 40 in a columnar shape is fixed with an adhesive 44 to the first installation part 45. The magnet 40 is provided in the first installation part 45 such that an N pole 40a faces a surface opposite to the front case 51, an S pole 40b faces a surface on the display rotating disk 54 side, the surface of the N pole 40a and the surface of the S pole 40b are orthogonal to the rotary shaft 53a, and the center of gravity is positioned on the extended line from the rotary shaft 53a.

A second installation part 46 exists in a position on the extended line from the rotary shaft 53a on the inner side of the front case 51. The second installation part 46 has an attachment component 47 and an attachment claw 48. The attachment component 47 is a component to attach a magnet 43 to the second installation part 46. The attachment claw 48, formed integrally with the front case 51, is used for fixing the attachment component 47 to the second installation part 46. The magnet 43 is fixed to the second installation part 46 by fixing the attachment component 47 to the second installation part 46 with the attachment claw 48. A round concave member is provided, in a direction opposite to the display rotating disk 54 at a central part of the attachment component 47, and the magnet 43 having a columnar shape is press-fitted in the concave member and fixed. When the magnet 43 is press-fitted in the concave member, the surface of the magnet 43 opposite to the display rotating disk 54 is exposed. Further, a hole 47a for insertion of the attachment claw 48 is provided on the outside of the round concave member of the attachment component 47. The attachment component 47 is fixed to the second installation part 46 by inserting the attachment claw 48 into the hole 47a.

The magnet 43 is provided in the second installation part 46 such that an N pole 43a faces a surface opposite to the display rotating disk 54, an S pole 43b faces a surface in contact with the bottom surface of the concave member of the attachment component. 47, the surface of the K pole 43a and the surface of the S pole 43b are orthogonal to the rotary shaft 53a, and the center of gravity is positioned on the extended line from the rotary shaft 53a.

In the flasher type fish finder S according to the present invention having this configuration, the two magnets 40 and 43 are fixed such that the N poles 40a and 43a are faced each other on the extended line from the rotary shaft 53a. Accordingly, these magnets 40 and 43 cause a repulsive force in the axial direction of the rotary shaft 53a between the magnet 40 and the magnet 43. At this time, the magnet 40 provided in the first installation part 45 is set on the display rotating disk 54 fixed to the rotary shaft 53a, on the other hand, the magnet 43 provided in the second installation part 46 is set in the front case 51 not influenced by the play of the rotary shaft. Accordingly, the magnet 40 fixed to the display rotating disk 54 is pushed in the axial direction by the play provided on the rotary shaft 53a with the repulsive force in the axial direction of the rotary shaft 53a. Accordingly, the movement of the rotary shaft 53a in the axial direction by the play is limited. Accordingly, in the flasher type fish finder S, it is possible to maintain constant balance of relative positional relationship between the display rotating disk 54 and the motor 53 regardless of inclination of the flasher type fish finder S, and it is possible to suppress occurrence of noise.

Further, in the flasher type fish finder S according to the present embodiment, it is possible to perform non-contact transmission of electric power between the power receiving coil 57 and the power transmission coil 53, and it is possible to perform non-contact transmission of light emission signal between the receiving antenna 59 and the transmitting antenna 60. Accordingly, in the flasher type fish finder S, it is possible to suppress occurrence of noise due to transmission of electric power and light emission signal. In addition, in the flasher type fish finder S according to the present invention, it is possible to maintain constant balance of relative positional relationship between the display rotating disk and the motor regardless of inclination of the flasher type fish finder, and it is possible to suppress occurrence of vibration and occurrence of noise. Accordingly, in the flasher type fish finder S, it is possible to further notably attain suppression of noise as an advantage of the present invention.

Further, as described above, as the magnet 40 and magnet 43 repel each other, the display rotating disk 54 is away from the front case 51 by the play provided on the rotary shaft 53a in the axial direction of the rotary shaft 53a. With this configuration, the air is kept between the first installation part 45 and the second installation part 46.

Next, the occurrence of attraction force in the axial direction of the rotary shaft 53a, with the magnet 40 provided in the first installation part 45 and the magnet 43 provided in the second installation part 46, will be described. When the distance between the first installation part 45 and the second installation part 46 is designed to be short, when the fish finder is pushed from the outside, the first installation part 45 and the second installation part 46 may be brought into contact by the influence of the attraction force.

On the other hand, when a repulsive force occurs in the axial direction of the rotary shaft 53a with the magnet 40 provided in the first installation part 45 and the magnet 43 provided in the second installation part 46, as the air is kept between the first installation part 45 and the second installation part 46, the possibility of contact between the first installation part 45 and the second installation part 46 is lowered. Accordingly, it is possible to lower the possibility of preventing rotation of the rotary shaft 53a caused by the contact between the first installation part 45 and the second installation part 46.

Further, in the display rotating disk 54, the magnet 40 is provided on the shaft center of the rotary shaft 53a. The magnet 43 is provided in the front case 51 such that it is opposite to the magnet 40 in the axial direction of the rotary shaft 53a. With this configuration, the magnet 40 provided on the display rotating disk 54 and the magnet 43 provided in the front case 51 are opposite to each other on the rotary shaft 53a in the axial direction of the rotary shaft 53a without adjusting the balance of positional relationship and magnetic force between the magnet 40 and the magnet 43. Accordingly, a repulsive force occurs in the axial direction of the rotary shaft 53a. It is possible to easily maintain constant balance of relative positional relationship between the motor 53 and the display rotating disk 54.

Further, the magnet 40 is fixed with the adhesive 44 in the first installation part 45. With the repulsive force in the axial direction of the rotary shaft 53a, caused between the magnet 40 provided in the first installation part 45 and the magnet 43 provided in the second installation part 46, the magnets 40 and 43 repel each other. Accordingly, the magnet 40 provided in the first installation part 45 and the magnet 43 provided in the second installation part 46 are respectively pressed with the repulsive force against the first installation part 45 and the second installation part 46. With this configuration, it is possible to fix the magnet 40 to the display rotating disk 54 only with adhesive force of the adhesive 44. Accordingly, it is possible to easily fix the magnet 40 to the first installation part 45 without using any special component, and it is possible to omit labor required for fixing.

In the present embodiment, the magnet 43 is press-fitted in the attachment component 47 and fixed, and further, the attachment component 47 is fixed with the attachment claw 48. Accordingly, in the flasher type fish finder S, by previously preparing the attachment component 47 to which the magnet 43 is fixed, it is possible to fix the magnet 43 to the second installation part 46 merely by fixing the attachment component 47 with the attachment claw 48. Further, it is possible to fix the magnet 43 to the attachment component 47 merely by press-fitting the magnet 43 into the attachment component 47. The adhesive can be omitted, and time for drying the adhesive can be omitted. Accordingly, it is possible to reduce time to fix the magnet 43 to the second installation part 46.

Note that in the present embodiment, the magnet 40 provided in the first installation part 45 and the magnet 43 provided in the second installation part 46 are provided such that the K poles face each other, however, the present invention is not limited to this arrangement. For example, the magnet 40 and the magnet 43 may be provided such that the S poles face each other. In this case, the repulsive force also occurs.

Further, the magnet 40 and the magnet 43 may be provided such that the N pole and the S pole face each other. In this case, an attraction force occurs between the magnet 40 and the magnet 43. The magnet 40 fixed to the display rotating disk 54 is pulled in the axial direction of the rotary shaft 53a with the attraction force in in the axial direction of the rotary shaft 53a by the play provided on the rotary shaft 53a. The movement of the rotary shaft 53a in the axial direction by the play is limited. Accordingly, it is possible to maintain constant balance of relative positional relationship between the display rotating disk 54 and the motor 53 regardless of inclination of the flasher type fish finder S, and it is possible to suppress occurrence of noise.

When the attraction force occurs between the magnet 40 and the magnet 43, there is a possibility that the magnet 40 and the magnet 43 come into contact by pushing or the like from the outside, as described above. Accordingly, to prevent contact between the magnet 40 and the magnet 43 even when pushed from the outside, the first installation part 45 and the second installation part 46 may be provided at a some distance between them.

Further, it may be configured such that a magnet is provided in one of the first installation part 45 and the second installation part 46, and a ferromagnetic material of iron or the like is provided in the other installation part. In this case, the attraction force also occurs between the magnet and the ferromagnetic material.

Next, the flasher type fish finder S according to a second embodiment of the present invention will be described with reference to FIG. 5. In the flasher type fish finder S according to the first embodiment, the columnar magnet 40 provided in the first installation part 45 and the columnar magnet 43 provided in the second installation part 46 are provided so as to be opposite on the rotary shaft 53a. Further, the magnet 40 is fixed to the first installation part 45 by using the adhesive 44. In the second installation part 46, the magnet 43 is press-fitted into the attachment component 47 and fixed, and further, the attachment component 47 is fixed by using the attachment claw 48. On the other hand, in the flasher type fish finder S according to the second embodiment, a second installation part 74 is provided in the front case 51 such that the center of circle of a ring-shaped magnet 70 is positioned on the extended line from the rotary shaft 53a, and the columnar magnet 40 in the first installation part 45 is provided on the extended line from the rotary shaft 53a. Further, the magnet 40 is fixed in the first installation part 45 by using a fixing component 41. The magnet 40 is fixed, not press-fitted and fixed in the fixing component 41, but is fixed when the fixing component 41 is fixed with the screw 42 to the display rotating disk 54, by being pressed with the fixing component 41. Further, in the second installation part 74, the magnet 70 is not fixed by using the attachment component 47, but is directly fixed by using a double-sided tape 71. Note that the other constituent elements of this flasher type fish finder S are the same as those in the first embodiment. Hereinbelow, the same constituent elements will have the same reference numerals as those in the first embodiment, and explanations of these constituent elements will be omitted.

Figure 5:
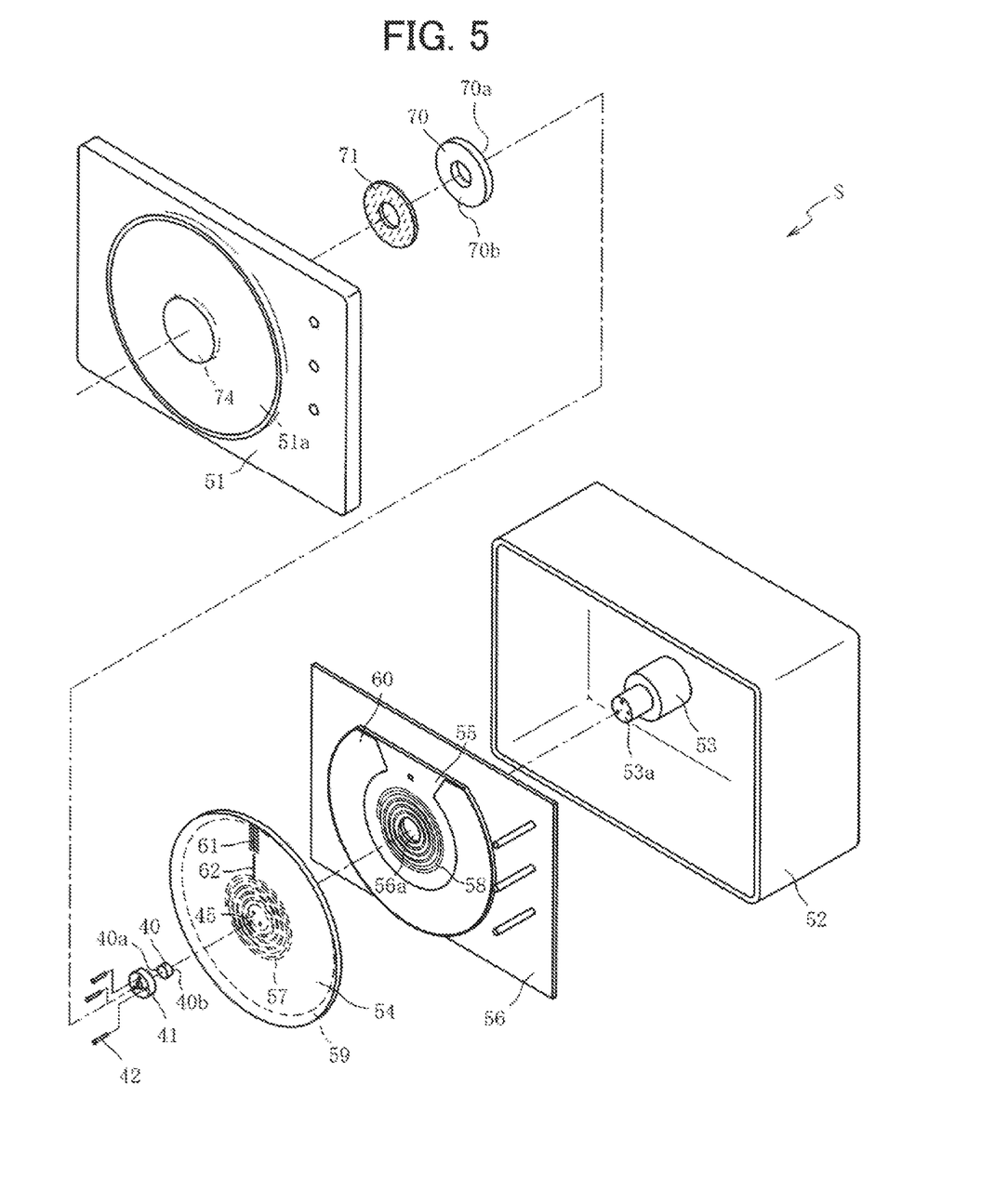
FIG. 5 is an exploded perspective view of the flasher type fish finder according to a second embodiment of the present invention.

FIG. 5 is an exploded perspective view of the flasher type fish finder S according to the second embodiment of the present invention. As shown in FIG. 5, the first installation part 45 has the fixing component 41 and the screw 42. The fixing component 41 is a component to fix the magnet 40 to the display rotating disk 54. The fixing component 41 has a cylindrical shape in which the magnet 40 is accommodated. An annular plate is formed at an end of an opening part of the fixing component 41 as a cylinder bottom surface on the front case 51 side. When the magnet 40 is accommodated in the fixing component 41, one bottom surface of the magnet 40 comes into contact with the surface of the annular plate on the inner side of the fixing component 41, and the other bottom surface of the magnet 40 comes into contact with the display rotating disk 54.

The annular plate is provided with a hole through which the screw 42 is passed. The radius of the opening part of the annular plate is smaller than the radius of the magnet 40. Accordingly, the magnet 40 is not passed through the opening part of the annular plate. Further, the display rotating disk 54 is also provided with a hole through which the screw 42 is passed. When the screw 42 is passed through the holes formed in the fixing component 41 and the display rotating disk 54, and screwed into the rotary shaft 53a, the fixing component 41 and the display rotating disk 54 are fixed. That is, the screw 42 fixes the fixing component 41 to the display rotating disk 54 while fixing the display rotating disk 54 to the rotary shaft 53a.

When the fixing component 41 is fixed to the display rotating disk 54, the columnar magnet 40 is pressed with the fixing component 41 against the display rotating disk 54 and fixed to the first installation part 45. The magnet 40 is provided in the first installation part 45 such that the N pole 40a faces the surface opposite to the front case 51, the S pole 40b faces the surface on the display rotating disk 54 side, the surface of the N pole 40a and the surface of the S pole 40b ace orthogonal to the rotary shaft 53a, and the center of gravity is positioned on the extended line from the rotary shaft 53a. At this time, as the annular plate is formed in the fixing component 41 on the front case 51 side, the magnet 40 is exposed in the opening part. With this configuration, it is possible to prevent the magnetic force of the magnet 40 from being shielded with the fixing component 41. Note that it may be configured such that not the annular plate but a round plate is formed in the fixing component 41 on the front case 51 side, not to expose the magnet 40. In this case, it is necessary to configure such that the magnet 40 has a magnetic force to, even when shielded with the fixing component 41, cause a repulsive force between the magnet 40 and a magnet 70 to be described later.

On the other hand, the second installation part 74 is provided on the inner side of the front case 51. In the second installation part 74, the magnet 70 is provided by using the double-sided tape 71 such that the circle center of the magnet 70 having an annular shape is positioned on the extended line from the rotary shaft 53a. The magnet 70 is provided in the second installation part 74 such that an N pole 70a faces the surface opposite to the display rotating disk 54, an S pole 70b faces the surface in contact with the double-sided tape 71, and the surface of the N pole 70a and the surface of the S pole 70b are orthogonal to the rotary shaft 53a.

At this time, the columnar magnet 40 is on the shaft center of the rotary shaft 53a, and the annular magnet 70 is on a circumference about the rotary shaft 53a as a circle center. The magnet 40 and the magnet 70 are not opposite to each other on the rotary shaft, however, a resultant force of the repulsive force occurred between the magnet 40 and the magnet 70 is directed in the direction of the rotary shaft 53a. Accordingly, the magnet 40 is pushed in the direction of the rotary shaft 53a with the resultant force of the repulsive force. Thus it is possible to suppress movement of the rotary shaft 53a by the play and it is possible to suppress occurrence or noise.

The first installation, part 35 has the fixing component 41 to fix the magnet 40 to the display rotating disk. 54 and the screw 42 to fix the fixing component 41 to the display rotating disk 54. With this configuration, as the fixing component 41 is fixed with the screw 42 to the display rotating disk 54, the magnet 40 is also fixed to the display rotating disk 54. Accordingly, even though the display rotating disk 54 is rotated with the motor 53, it is possible to infallibly fix the magnet 40.

Further, the fixing component 41 is fixed, with the screw 42 to fix the display rotating disk 54 to the rotary shaft 53a, to the display rotating disk 54. With this configuration, it is possible to fix the magnet 40 to the display rotating disk 54 while fixing the display rotating disk 54 to the rotary shaft 53a. Accordingly, as it is possible to collectively fix the display rotating disk 54 and the fixing component 41, it is possible to reduce the number of screws. Further, as it is possible to fix the fixing component 41 while fixing the display rotating disk 54 to the rotary shaft 53a, it is possible in a manufacturing process to omit labor of attachment of the display rotating disk 54 and the fixing component 41.

Further, in the second installation part 74, the magnet 70 is fixed with the double-sided tape 71. Note that a repulsive force in the axial direction of the rotary shaft 53a occurs between the magnet 40 provided in the first installation part 45 and the magnet 70 provided in the second installation part 74, and the magnets repel each other. Accordingly, the magnet 40 provided in the first installation part 45 and the magnet 70 provided in the second installation part 74 are respectively pressed with the repulsive force against the first installation part 45 and the second installation part 74. Further, as the second installation part 74 is not rotated with the motor 53, it is not necessary to firmly fix the magnet 70. With this configuration, it is possible to fix the magnet 70 to the front case 51 by, not necessarily using a component to fix the magnet, but merely using the double-sided tape 71.

Accordingly, a component to fix the magnet 70 to the second installation part 74 is unnecessary. Further, by using the double-sided tape 71, it is possible to attach the magnet 70 to the second installation part 74, by removing release paper attached to an adhesive face of the double-sided tape 71 and attaching the magnet 70 and the second installation part 74 together. Accordingly, it is possible in a production process to omit labor to provide the magnet 70 in the second installation part 74 by using a fixing component.

Note that the magnet 40 and the magnet 70 may be provided in a direction where the attraction force occurs. Further, it may be configured such that a magnet is provided in one of the first installation part 45 and the second installation part 74, and a ferromagnetic material of iron or the like is provided in the other installation part.

Further, it may be configured such that when the magnets 40 and 70 are provided such that an attraction force occurs between the magnet 40 and the magnet 70, the magnet 70 is fixed to the second installation part 74 by pressing the magnet 70 with a fixing component fixed to the front case 51 with a screw, without using the double-sided tape 71. As the magnet 70 is pulled to the magnet 40 with the attraction force, it is necessary to firmly fix the magnet 70 with the fixing component.

Note that even when the attraction force occurs between the magnet 40 and the magnet 70, the magnet 70 may be fixed with the double-sided tape 71. In this case, the double-sided tape 71 having an adhesive force to prevent removal of the magnet 70 due to the attraction force may be used.

In addition, the flasher type fish finder S according to the second embodiment, having the same configuration as that in the first embodiment, obtains the same advantages as those obtained in the first embodiment.

Next, the flasher type fish finder S according to a third embodiment of the present invention will be described with reference to FIG. 6.

In the flasher type fish finder S according to the first embodiment, the first installation part 45 is provided on the display rotating disk 54. In the second installation part 46, the magnet 43 is press-fitted in the attachment component 47 and fixed, and further, the attachment component 47 is fixed to the second installation part 46. On the other hand, in the flasher type fish finder S according to the third embodiment, a first installation part 30 is provided on a rotary shaft 53b. Further, in the second installation part 46, the attachment component 47 is not used, but the magnet 43 is fitted into a fixing claw 78 and fixed. Note that the other constituent elements of this flasher type fish finder S are the same as those in the first embodiment. Hereinbelow, the same constituent elements will have the same reference numerals as those in the first embodiment, and explanations of these constituent elements will be omitted.

Figure 6:
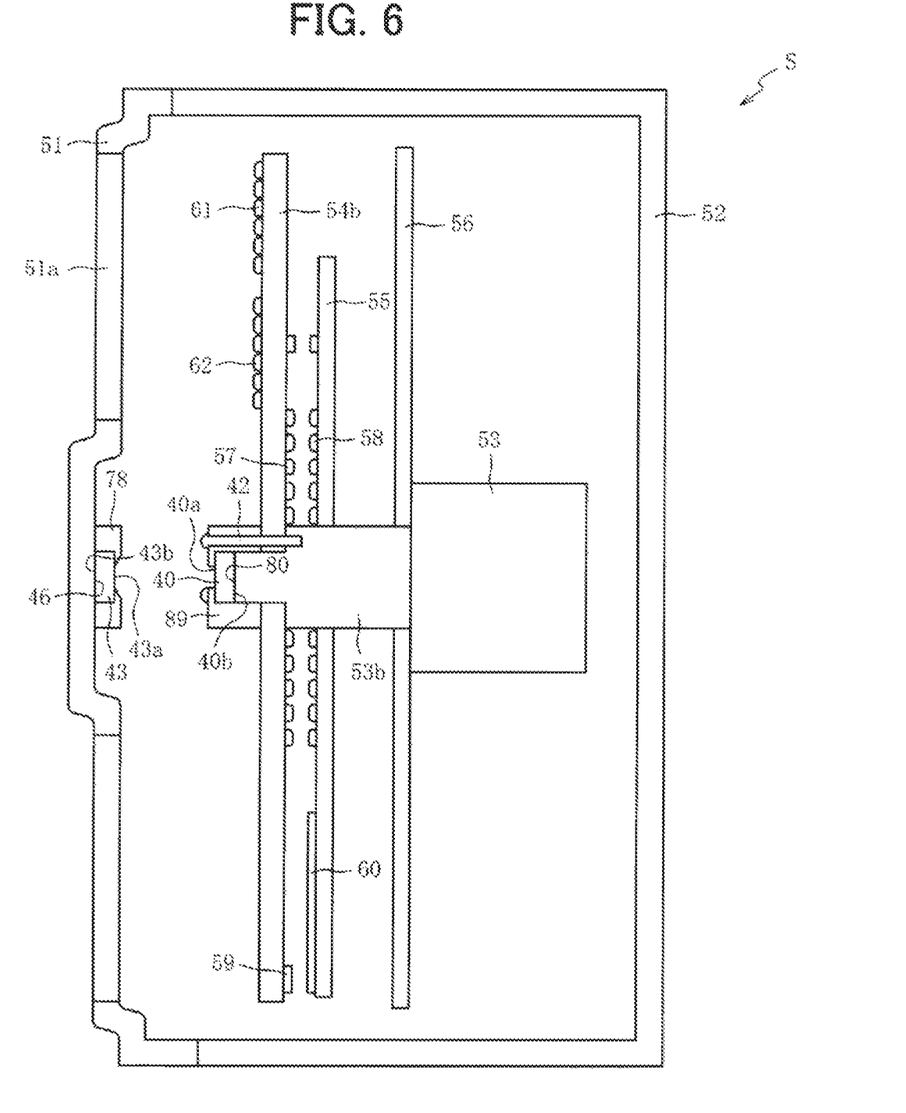
FIG. 6 is a side cross-sectional view of the flasher type fish finder according to a third embodiment of the present invention.

FIG. 6 is a side cross-sectional view of the flasher type fish finder according to the third embodiment of the present invention. As shown in FIG. 6, in the middle of the rotary shaft 53b, the radius of the rotary shaft 53b changes from a first radius to a second radius. The radius of the rotary shaft 53b is the first radius on the motor 53 side, whereas the radius of the rotary shaft 53b is the second radius shorter than the first radius on the end side of the rotary shaft 53b. A display rotating disk 54b is fixed with the screw 42 to the first radius part of the rotary shaft 53b in a position where the radius of the rotary shaft 53b changes from the first radius to the second radius. In the rotary shaft 53b, the second radius part passes through the center of the display rotating disk 54b. The first installation part 80 is provided on a surface of the rotary shaft 53b on the end side.

The first installation part 80 has a fixing component 89 and the screw 42. The fixing component 89 has a cylindrical shape in which the magnet 40 and the end part of the rotary shaft 53b are accommodated. Further, an annular plate is formed at an end of an opening part of the fixing component 39 as a cylinder bottom surface on the front case 51 side. When the magnet 40 is accommodated in the fixing component 89, one bottom surface of the magnet 40 comes into contact with the surface or the annular plate on the inner side of the fixing component 89, and the other bottom surface of the magnet 40 comes into contact with the rotary shaft 53b.

The annular plate is provided with a hole through which the screw 42 is passed. The radius of the opening part of the annular plate is smaller than the radius of the magnet 40. Accordingly, the magnet 40 is not passed through the opening part. Further, the display rotating disk 54b is also provided with a hole through which the screw 42 is passed. When the screw 42 is passed through the holes formed, in the fixing component 89 and the display rotating disk 54b, and screwed into the rotary shaft 53b, the fixing component 89 and the display rotating disk 54b are fixed. That is, the screw 42 fixes the fixing component 89 to the display rotating disk 54b while fixing the display rotating disk 54b to the rotary shaft 53b.

When, the fixing component 89 is fixed to the display rotating disk 54b, the columnar magnet 40 is pressed with the fixing component 89 against the display rotating disk 54b and fixed to the first installation part 80. The magnet 40 is provided in the first installation part 80 such that the N pole 40a faces the surface opposite to the front case 51, the S pole 40b is in contact with the surface of the rotary shaft 53b on the end side, the surface of the N pole 40a and the surface of the S pole 40b are orthogonal to the rotary shaft 53b, and the center of gravity is positioned on the extended line from the rotary shaft 53b.

The second installation part 46 exists in a position on the extended line from the rotary shaft 53b on the inner side of the front case 51. In the second installation part 46, a pair of fixing claws 78 are formed integrally with the front case 51. The fixing claw 78 is a claw in which the magnet 43 is fitted in and fixed.

The magnet 43 is provided in the second installation part 46 such that the N pole 43a faces the surface opposite to the first installation part 80, the S pole 43b faces the surface in contact with the front case 51, the surface of the N pole 43a and the surface of the S pole 43b are orthogonal to the rotary shaft 53b, and the center of gravity is positioned on the extended line from the rotary shaft 53b.

As the N pole 40a of the magnet 40 and the N pole 43a of the magnet 43 are opposite to each other on the rotary shaft 53b, even when the magnet 40 is fixed to the rotary shaft 53b as described in the present embodiment, a repulsive force occurs in the axial direction of the rotary shaft 53b between the magnet 40 and the magnet 43. At this time, the magnet 40 in the first installation part 30 is fixed to the rotary shaft 53b, whereas the magnet 43 in the second installation part 46 is provided in the front case 51 not influenced by the play of the rotary shaft. Accordingly, the magnet 40 fixed to the rotary shaft 53b is pushed in the axial direction by the play provided on the rotary shaft 53b with the repulsive force in the axial direction of the rotary shaft 53b. Accordingly, the movement in the axial direction of the rotary shaft 53b by the play is limited. Accordingly, regardless of inclination of the flasher type fish finder 5, it is possible to maintain constant balance of relative positional relationship between the display rotating disk 54 and the motor 53, and it is possible to suppress occurrence of noise.

Further, it is possible to fix the magnet 43 by fitting the magnet 43 into the fixing claw 78 in the second installation part 46. With this configuration, it is possible to firmly fix the magnet 43 without using an adhesive, a double-side tape, an attachment component, a fixing component, a screw, or the like.

Note that the magnet 40 and the magnet 43 may be provided in a direction where an attraction force occurs. Further, it may be configured such that a magnet is provided in one of the first installation part 80 and the second installation part 46, and a ferromagnetic material of iron or the like is provided in the other installation part.

In addition, the flasher type fish finder S according to the third embodiment, having the same configuration as that in the first embodiment, obtains the same advantages as those obtained in the first embodiment.

Next, the flasher type fish finder S according to a fourth embodiment of the present invention will be described with reference to FIG. 7. In the flasher type fish finder S according to the first embodiment, it is possible to perform non-contact transmission of electric power between the power receiving coil and the power transmission coil, and it is possible to perform non-contact transmission of light emission signal between the receiving antenna and the transmitting antenna. On the other hand, in the flasher type fish finder S according to the fourth embodiment, electric power and light emission signal are transmitted by contact between a brush 98 and a slip ring 91. Note that the other constituent elements of this flasher type fish finder S are the same as those in the first embodiment. Hereinbelow, the same constituent elements will have the same reference numerals as those in the first embodiment, and explanations of these constituent elements will be omitted.

Figure 7:
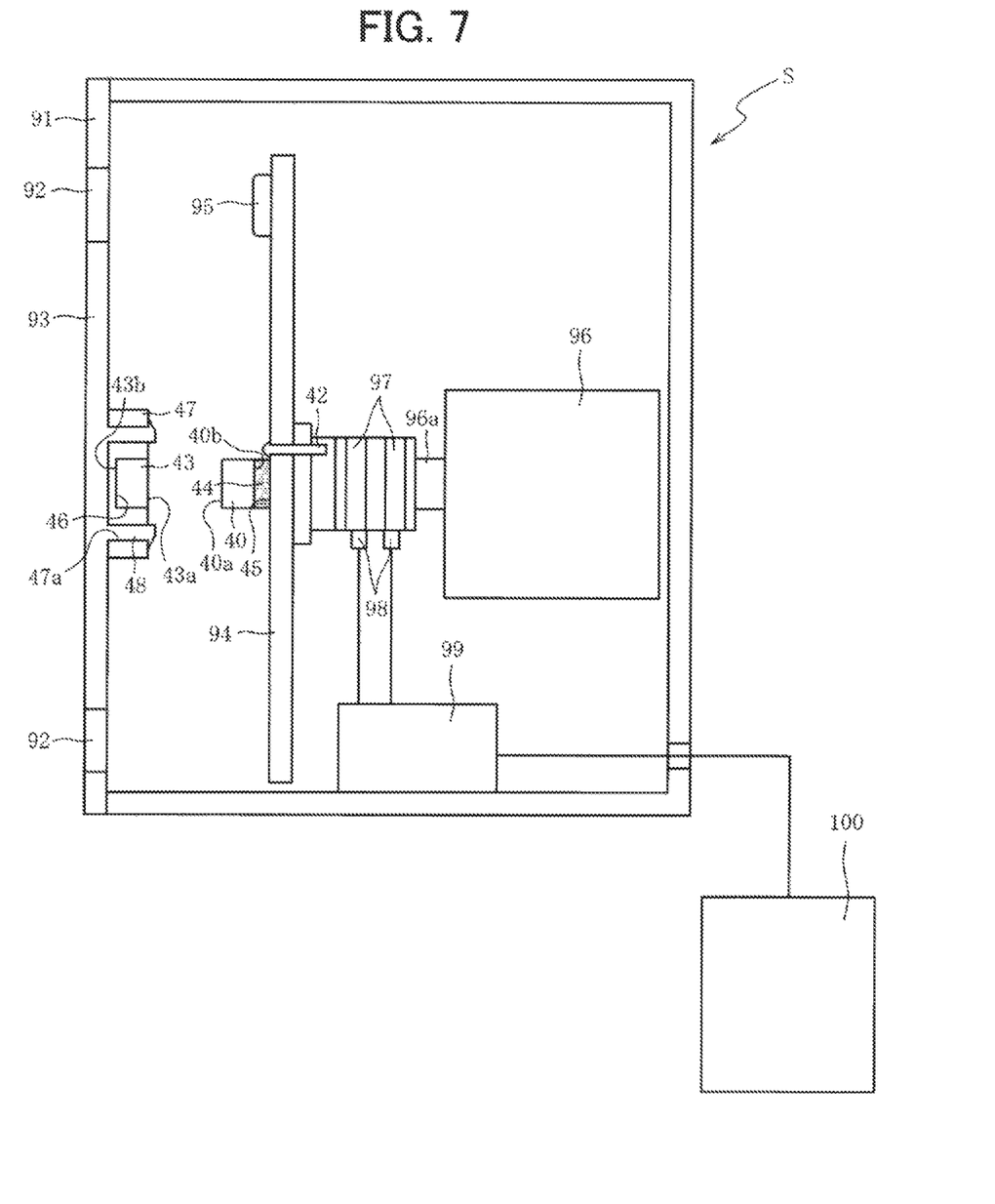
FIG. 7 is a side cross-sectional view of the flasher type fish finder according to a fourth embodiment of the present invention.

FIG. 7 is a side cross-sectional view of the flasher type fish finder according to the fourth embodiment of the present invention. As shown in FIG. 7, the flasher type fish finder S has an input circuit 99 to input a signal from a transmitter-receiver 100 which transmits an ultrasonic wave in the water and receives its reflected wave. The electric power and the light emission signal generated with the input circuit 99 are sent from the input circuit 99 via the brush 98 to the slip ring 97. At this time, the brush 98 comes into contact with the slip ring 97 fixed to a rotary shaft 96a, to send the electric power and the light emission signal to the slip ring 97.

As in the case of the flasher type fish finder S according to the first embodiment, the second installation part 46 is provided on the inner side of a front case 91. In the second installation part 46, the magnet 43 is press-fitted in the attachment component 47 and fixed, and further, the attachment component 47 is fixed with the attachment claw 48. The magnet 43 is provided in the second installation part 46 such that the N pole 43a faces the surface opposite to a display rotating disk 94, the S pole 43b faces the surface in contact with the bottom surface of the concave member of the attachment component 47, the surface of the N pole 43a and the surface of the S pole 43b are orthogonal to the rotary shaft 96a, and the center of gravity is positioned on the extended line from the rotary shaft 96a.

The first installation part 45 is provided on the surface of the display rotating disk 94 on the front case 91 side. In the first installation part 45, the magnet 40 is fixed with the adhesive 44. The magnet 40 is provided in the first installation part 45 such that the N pole 40a faces the surface opposite to the front case 91, the S pole 40b faces the surface on the display rotating disk 54 side, the surface of the N pole 40a and the surface of the S pole 40b are orthogonal to the rotary shaft 96a, and the center of gravity is positioned on the extended line from the rotary shaft 96a. The display rotating disk 54 is fixed with the screw 42 to the rotary shaft 96a.

In the flasher type fish finder S having the slip ring 97 and the brush 98, a display rotating disk 95 is fixed to the rotary shaft 96a. Further, the rotary shaft 96a has movable play in an axial direction. On the other hand, in the flasher type fish finder S according to the present invention having this configuration, the movement of the rotary shaft 96a in the axial direction by the play is limited with a repulsive force occurred with the magnet 40 and the magnet 43. Accordingly, regardless of inclination of the flasher type fish finder S, it is possible to maintain constant balance of relative positional relationship between the display rotating disk 94 and a motor 96, and it is possible to suppress occurrence of noise.

Note that in the flasher type fish finder S having the slip ring 97 and the brush 93, by contact between the rotating slip ring 97 and the brush 98, vibration and noise occur. On the other hand, according to the present invention, it is possible to suppress vibration and noise caused by change of balance of relative positional relationship between the display rotating disk 95 attached to the rotary shaft 96a of the motor 96 and the motor 96. Accordingly, it is possible to reduce noise.

Note that the magnet 40 and the magnet 43 may be provided in a direction where the attraction force occurs.

Further, the flasher type fish finder S according to the fourth embodiment, having the same configuration as that in the first embodiment, obtains the same advantages as those obtained in the first embodiment.

As described above, the present invention has been explained based on the embodiments. It should be understood that the invention is not to be limited to the embodiments as described above, but various modifications and alterations of the present invention will be apparent to those skilled in the art without departing from the scope and spirit of the invention. For example, the embodiments may be respectively modified by adding a part or plural parts of constituent elements of another embodiment, or changing the part or plural parts of the constituent elements with those of the other embodiment.

In the above-described flasher type fish finder having the brush and the slip ring according to the fourth embodiment, it may be configured such that a magnet is provided in one of the first installation part and the second installation part, and a ferromagnetic material of iron or the like is provided in the other installation part.

In the above-described flasher type fish finder having the brush and the slip ring according to the fourth embodiment, two magnets may be provided such that the resultant force of the attraction force or repulsive force between the magnet provided in the first installation part and the magnet provided in the second installation part is directed in the direction of the rotary shaft.

The configuration of the magnets in the first installation part and the second installation part described in the second embodiment and the third embodiment may be applied to the flasher type fish finder having the brush and the slip ring.

In the above-described respective embodiments, as a method of fixing the magnet to the first installation part and the second installation part, the magnet is directly fixed with the adhesive, or the magnet is fixed to the attachment component and further the attachment component is fixed with the attachment claw, or the magnet is pressed with the fixing component when the fixing component is fixed with the screw, or the magnet is fixed with the double-sided tape, or the magnet is directly fixed with the fixing claw. The method of fixing the magnet to the first installation part and the second installation part may be arbitrary combination of the above methods. For example, in the first embodiment, the magnet may be directly fixed to the second installation part by using the adhesive. Further, in the first embodiment, the first installation part may be provided with the attachment claw, and the magnet may be press-fitted in the attachment component and fixed, and further, the attachment component may be fixed with the attachment claw.

In the above-described first embodiment and the fourth embodiment, as the method of fixing the magnet 43 to the attachment component 47, the magnet is press-fitted, however, the fixing is not limited to this method. For example, the magnet 43 may be fixed to the attachment component 47 by using the adhesive 44 or the double-sided tape.

What is claimed is:

1. A flasher type fish finder having a motor provided with a rotary shaft having movable play in an axial direction, and a display rotating disk fixed to the rotary shaft, comprising:
    a first installation part in which a magnet or a ferromagnetic material is provided on the rotary shaft or the display rotating disk so as to set the center of gravity at the shaft center of the rotary shaft; and
    a second installation part, fixed to a member not influenced by the play of the rotary shaft, in which a magnet or a ferromagnetic material is provided so as to cause an attraction force or a repulsive force in the axial direction of the rotary shaft with respect to the magnet or the ferromagnetic material provided in the first installation part,
    wherein the magnet is provided in at least one of the first installation part and the second installation part so as to set a surface of a first magnetic pole and a surface of a second magnetic pole to be orthogonal to the rotary shaft.

2. The flasher type fish finder according to claim 1, wherein in the first installation part, the magnet or the ferromagnetic material is provided on the shaft center of the rotary shaft,
    and wherein in the second installation part, the magnet or the ferromagnetic material is provided so as to be opposite to the magnet or the ferromagnetic material provided in the first installation part in the axial direction of the rotary shaft.

3. The flasher type fish finder according to claim 1, wherein the first installation part has:
    a fixing component to fix the magnet or the ferromagnetic material to the rotary shaft or the display rotating disk; and
    a fixing member to fix the fixing component to the rotary shaft or the display rotating disk.

4. The flasher type fish finder according to claim 2, wherein the first installation part has:
    a fixing component to fix the magnet or the ferromagnetic material to the rotary shaft or the display rotating disk; and
    a fixing member to fix the fixing component to the rotary shaft or the display rotating disk.

5. The flasher type fish finder according to claim 3, wherein the fixing member is a screw to fix the display rotating disk to the rotary shaft.

6. The flasher type fish finder according to claim 4, wherein the fixing member is a screw to fix the display rotating disk to the rotary shaft.

7. The flasher type fish finder according to claim 1, wherein in the first installation part, the magnet is provided with the surface of the first magnetic pole facing the second installation part,
    and wherein in the second installation part, the magnet is provided with the surface of the first magnetic pole facing the first installation part.

8. The flasher type fish finder according to claim 2, wherein in the first installation part, the magnet is provided with the surface of the first magnetic pole facing the second installation part,
    and wherein in the second installation part, the magnet is provided with the surface of the first magnetic pole facing the first installation part.

9. The flasher type fish finder according to claim 3, wherein in the first installation part, the magnet is provided with the surface of the first magnetic pole facing the second installation part,
    and wherein in the second installation part, the magnet is provided with the surface of the first magnetic pole facing the first installation part.

10. The flasher type fish finder according to claim 4, wherein in the first installation part, the magnet is provided with the surface of the first magnetic pole facing the second installation part,
    and wherein in the second installation part, the magnet is provided with the surface of the first magnetic pole facing the first, installation part.

11. The flasher type fish finder according to claim 5, wherein in the first installation part, the magnet is provided with the surface of the first magnetic pole facing the second installation part,
    and wherein in the second installation part, the magnet is provided with the surface of the first magnetic pole facing the first installation part.

12. The flasher type fish finder according to claim 6, wherein in the first installation part, the magnet is provided with the surface of the first magnetic pole facing the second installation part,
    and wherein in the second installation part, the magnet is provided with the surface of the first magnetic pole facing the first installation part.

13. The flasher type fish finder according to claim 7, wherein the second installation part has an adhesive to attach the magnet to the member not influenced by the play of the rotary shaft.

14. The flasher type fish finder according to claim 8, wherein the second installation part has an adhesive to attach the magnet to the member not influenced by the play of the rotary shaft.

15. The flasher type fish finder according to claim 9, wherein the second installation part has an adhesive to attach the magnet to the member not influenced by the play of the rotary shaft.

16. The flasher type fish finder according to claim 10, wherein the second installation part has an adhesive to attach the magnet to the member not influenced by the play of the rotary shaft.

17. The flasher type fish finder according to claim 11, wherein the second installation part has an adhesive to attach the magnet to the member not influenced by the play of the rotary shaft.

18. The flasher type fish finder according to claim 12, wherein the second installation part has an adhesive to attach the magnet to the member not influenced by the play of the rotary shaft.

19. The flasher type fish finder according to claim 2, wherein the first installation part has an adhesive to attach the magnet to the display rotating disk, and wherein the second installation part has:
an attachment component to attach the magnet to the member not influenced by the play of the rotary shaft; and
an attachment member to attach the attachment component to the member not influenced by the play of the rotary shaft.

20. The flasher type fish finder according to claim 8, wherein the first installation part has an adhesive to attach the magnet to the display rotating disk, and wherein the second installation part has:
an attachment component to attach the magnet to the member not influenced by the play of the rotary shaft; and
an attachment member to attach the attachment component to the member not influenced by the play of the rotary shaft.

* * * * *